3,784,560
PROCESS FOR THE PRODUCTION OF METHACRYLONITRILE
Takachika Yoshino, Yokohama, Shigeru Saito, Fuchu, Masukuni Sobukawa and Isao Nagase, Yokohama, Masao Nikura, Chigasaki, and Jun Ishikura and Yutaka Sasaki, Yokohama, Japan, assignors to Nitto Chemical Industry Co., Ltd., Tokyo, Japan
No Drawing. Filed May 20, 1971, Ser. No. 145,500
Claims priority, application Japan, May 23, 1970, 45/43,714; Aug. 7, 1970, 45/68,690; Sept. 28, 1970, 45/84,145
Int. Cl. C07c 121/02
U.S. Cl. 260—465.3                8 Claims

ABSTRACT OF THE DISCLOSURE

A process for the production of methacrylonitrile in high yields by vapor-phase catalytic ammoxidation of isobutylene utilizing a catalyst comprising as the principle catalytic components at least one oxide selected from the group consisting of Fe, Mn, Co, Ni, Cd and Pb oxides together with an oxide of tungsten, and, optionally, at least one oxide of an element selected from the group consisting of P, B, S, Se and Te.

BACKGROUND OF THE INVENTION

(1) Field of the invention

This invention relates to a process for production of methacrylonitrile by vapor-phase catalytic ammoxidation of isobutylene.

It is a major object of this invention to provide a process favorably effecting formation of methacrylonitrile by an ammoxidation reaction of isobutylene by the use of a catalyst with excellent catalytic activity.

A prominent feature of this invention is the use of a novel catalyst comprising as the principal catalytic components an oxide of at least one element selected from the group consisting of iron, manganese, cobalt, nickel, cadmium and lead and oxide of tungsten and, optionally, at least one oxide of an element selected from the group consisting of phosphorus, boron, sulfur, selenium and tellurium added as the promoter to the above.

(2) Description of the prior art

A variety of catalysts have heretofore been proposed for vapor-phase catalytic ammoxidation reactions of isobutylene. Most of these catalysts are unsatisfactory in activity, selectivity and life.

SUMMARY OF THE INVENTION

After an extensive investigation with the object of overcoming these faults, we have found that compositions derived from a combination comprising as the principal catalytic component an oxide of at least one element selected from the group consisting of iron, manganese, cobalt, nickel, cadmium and lead together with an oxide of tungsten exert excellent activity in the ammoxidation reaction of isobutylene.

As compared with the prior-art catalysts the catalysts of this invention are characterized by having high selectivity for the production of methacrylonitrile with high isobutylene conversion.

Moreover, the catalysts of this invention, which are characterized in that they are activated at a temperature considerably higher than the reaction temperature and consequently are stable and durable having excellent activity for a long period of time. They are highly favorable from the industrial point of view.

We have further discovered that addition to the catalyst described above of a promoter comprising at least one element selected from the group consisting of phosphorus, boron, sulfur, selenium and tellurium further improves the activity and selectivity.

DESCRIPTION OF THE INVENTION

The atomic ratio of the iron, manganese, cobalt, nickel, cadmium or lead component (called the component A in some cases) to the tungsten component is preferably from 10:1 to 10:90. An atomic ratio from 10:1 to 10:30 is particularly preferred. The phosphorus, boron, sulfur, selenium or tellurium component is preferably added at an atomic ratio from 0 to 15 to 10 of the component A.

Catalysts of the composition as described above are produced by any known method. It is critical that the components are intimately blended to a homogeneous substance.

The starting material for providing the component A of the catalyst, namely the iron, manganese, cobalt, nickel, cadmium or lead component may be selected from a variety of sources. For example, a stable oxide of the component element may be used. Alternatively, a compound finally stabilized as the oxide after chemical or calcination treatment may be employed such as, for example, nitrate or chloride. The compound may be calcinated to an oxide either directly or following conversion into a hydroxide by neutralizing with an alkali such as aqueous ammonia. Whatever starting material is selected, it is critical to effect intimate blending with other components.

Any tungsten compound, soluble or insoluble in water, may be used as the starting material for the tungsten component. For example, tungsten trioxide, tungstic acid, ammonium paratungstate, ammonium metatungstate or tungsten halides may be employed.

As the starting materials for providing the phosphorus, boron and sulfur components may be used a variety of compounds of these elements. In general, phosphoric, boric and sulfuric acids may be employed as the phosphorus, boron or sulfur components, respectively. As the selenium component may be used any selenium compound soluble or insoluble in water. For example, selenium dioxide, selenious acid and the like may be employed. Products obtained from nitric acid oxidation of metallic selenium may also be employed.

Any tellurium compound, soluble or insoluble in water, may be used as the tellurium component. For example, tellurium dioxide, tellurous acid or telluric acid may be employed. Products from nitric acid oxidation of metallic tellurium may also be employed.

It is desirable that the phosphorus, boron, sulfur, selenium or tellurium component is intimately blended with the component A and the tungsten component at an early stage to prepare the catalystic composition. Alternatively, a base catalyst composed of the component A and the tungsten component may be initially prepared followed by impregnation with the phosphorus, boron, sulfur, selenium or tellurium component. In such a case, it is preferred to impregnate the base catalyst with an aqueous solution of the latter component.

The activity of the catalysts of this invention is enhanced by heating at an elevated temperature. The mixture containing the catalytic starting materials intimately blended to the desired composition is dried and then heated preferably at a temperature from 200° to 600° C. for a period from 2 to 24 hours and subsequently, if necessary, at a temperature from 500° to 1000° C. for a period from 1 to 48 hours. The starting materials should be formulated so that the catalyst, after completion of the calcination treatment, and ready for use in the reaction has the predetermined composition.

The catalyst may be combined with an appropriate carrier, although it exerts excellent activity when used without any carrier. It may be formulated in such a manner that the catalytic composition contains from 10 to 90% by weight of the active components and from 90 to 10% by weight of the carrier on the basis of the entire composition. Silica, alumina, zirconia, magnesia, silica-alumina, silicone carbide, alundum, inorganic silicate and the like may be employed as the carrier. Additives such as binding agent used for improving physical properties of the catalyst may optionally be added provided that they produce no adverse effects upon the activity. Whatever amounts of additives such as carrier, binding agent and filler are employed they may optionally be added provided that they cause no marked changes in characteristics property of the catalysts of this invention as set forth hereinbelow and illustrated in the below mentioned examples. It is to be understood that catalyst compositions containing these additives are regarded to be the catalysts within the scope of this invention.

The catalysts may be used either in the form of pellet in fixed-bed reactor or in the form of fine particle in fluidized-bed reactor as may be desired.

Reaction conditions under which the catalysts of this invention are used are described below.

The materials that are used for the instant ammoxidation reaction are oxygen, ammonia and isobutylene. The starting isobutylene may contains paraffin hydrocarbons such as ethane, propane, butanes and pentanes.

Any oxygen sources may be employed but from the economical point of view air is favorable. The air may be appropriately enriched with oxygen. An oxygen/isobutylene molar ratio higher than 0.5, desirably above 1 is preferred. A molar ratio from about 2 to 6 is suitable for the reaction and that from 2 to 4 is particularly preferable.

An ammonia/isobutylene molar ratio from about 0.7 to 3 is suitable for the purpose.

Since the addition of water is often effective for inhibiting formation of carbon dioxide, it may be added to the reaction system, if necessary.

As is apparent from the fact that air, a mixture of oxygen with nitrogen, can be employed as the oxygen sources, the addition of other appropriate diluents may be employed.

It is preferred, but not necessary, to charge the isobutylene, oxygen, ammonia and, in some instances, diluent in gaseous mixture into the reactor. If desired, those materials which can be liquefied may be charged in liquid. Alternatively, the components may be charged into the reactor through separate inlets. In any case, it is satisfactory that the reactants contact the catalyst as a gaseous mixture. The temperature at which the reaction is effected is suitably from about 370° to 550° C. and a temperature from about 400° to 500° C. produces especially good results. From the operational point of view the reaction is carried out under approximately atmospheric pressure, although if necessary, reduced or elevated pressure may be employed.

The space velocity, which is an important factor for the vapor-phase catalytic reaction using a solid catalyst, is suitably from about 2000 to 100 hr.$^{-1}$ in using the catalyst of this invention. A space velocity from about 1000 to 200 hr.$^{-1}$ gives especially good results. The space velocity as referred to herein means the volume of gas passing per unit volume of the catalyst per hour in terms of NTP.

Recovery of methacrylonitrile from the reaction product may be conducted by washing the outlet gas from the reactor with cold water or a solvent suitable for extracting methacrylonitrile. Any conventional means for recovery in the reactions of this nature may be employed.

The catalyst of this invention may be used either in fixed bed, moving bed, or fluidized bed catalyst equipment conventionally used for the vapor-phase catalytic reaction.

DESCRIPTION OF PREFERRED EMBODIMENTS

Constructions and results of this invention in embodiment are described by the following examples.

Preparation of the Catalyst

Example 1

A catalyst with the empirical formula $Fe_{10}W_2O_{21}(SiO_2)_{30}$ was prepared by the following procedures:

To a solution composed of 81 ml. of nitric acid, specific gravity 1.38 and 100 ml. of water were added in small portions 11.2 g. of electrolytic iron powders to form a complete solution. (I)

In 550 ml. of water was dissolved 10.4 g. of ammonium tungstate $(5(NH_4)_2O \cdot 12WO_3 \cdot 5H_2O$ as described Merck Index). (II)

As the carrier component was used 180 g. of silica sol containing 20% (by weight) $SiO_2$. (III)

(I) and (III) were mixed followed by mixing with (II). The resulting mixture was heated under good stirring to dryness. The dried mass, after being pulverized, was calcined at 200° C. for 2 hours and then at 400° C. for 2 hours, followed by addition of water. The hydrated mass was kneaded, dried at 130° C. for 16 hours and then pulverized. The pulverized mass was calcined at 900° C. for 2 hours.

Example 2

A catalyst with the empirical formula

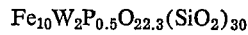
$Fe_{10}W_2P_{0.5}O_{22.3}(SiO_2)_{30}$ was prepared by the following procedures:

To a solution composed of 81 ml. of nitric acid, specific gravity 1.38, and 100 ml. of water were added in small portions 11.2 g. of electrolytic iron powders to form a complete solution (I).

In 550 ml. of water was dissolved 10.4 g. of ammonium tungstate.

To the ammonium tungstate solution prepared as above was added 1.2 g. of phosphoric acid (purity 85%) to form a solution (II).

As the carrier component was used 180 g. of silica sol containing 20% (by weight) $SiO_2$ (III).

(I) and (III) were mixed followed by mixing with (II). The resulting mixture was heated under good stirring to dryness. The dried mass, after being pulverized, was calcined at 200° C. for 2 hours and then at 400° C. for 2 hours, followed by addition of water. The hydrated mass was kneaded, calcined at 130° C. for 16 hours and then pulverized. The pulverized mass was calcined at 900° C. for 2 hours.

Example 3

A catalyst with the empirical formula $Fe_{10}W_2B_{1.0}O_{22.5}(SiO_2)_{30}$ was prepared in accordance with the procedures described in Example 2 except that boric acid was used in place of the phosphoric acid.

Example 4

A catalyst with the empirical formula

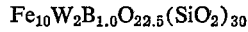
$Fe_{10}W_2Se_{0.5}O_{22}(SiO_2)_{30}$ was prepared in accordance with the procedures described in Example 2 except that selenium dioxide was used in place of the phosphoric acid.

Examples 5 and 6

A catalyst with the empirical formula

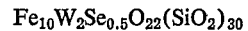
$Fe_{10}W_2Te_2O_{25}(SiO_2)_{30}$ (Example 5) and one with the empirical formula

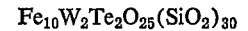
$Fe_{10}W_{25}Te_4O_{98}(SiO_2)_{30}$

(Example 6) were prepared respectively in accordance with the procedures described in Example 2 except that tellurium dioxide was used in place of the phosphoric acid.

Example 7

A catalyst with the empirical formula $$Mn_{10}W_2O_{26}(SiO_2)_{30}$$

was prepared by the following procedures:

In 100 ml. of water was dissolved 57.4 g. of manganese nitrate $(Mn(NO_3)_2 \cdot 6H_2O)$ (I).

To a solution of 10.4 g. of ammonium tungstate $(5(NH_4)_2O \cdot 12WO_3 \cdot 5H_2O)$ in 100 ml. of water was added 180 g. of silica sol containing 20% (by weight) $SiO_2$ as the carrier component (II).

A mixture of (I) and (II) was heated under good stirring to dryness. The dried mass, after being pulverized, was calcined at 200° C. for 2 hours and then at 400° C. for 2 hours, followed by addition of water. The hydrated mass was kneaded and formed into pellets. The pellets were dried at 130° C. for 16 hours and then calcined at 650° C. for 4 hours.

Example 8

A catalyst with the empirical formula $$Mn_{10}W_{25}O_{95}(SiO_2)_{30}$$

was prepared in accordance with the procedures described in Example 7.

Example 9

A catalyst with the empirical formula $$Mn_{10}W_{25}P_{2.0}O_{100}(SiO_2)_{30}$$

was prepared by the following procedures:

In 100 ml. of water was dissolved 57.4 g. of manganese nitrate $(MN(NO_3)_2 \cdot 6H_2O)$ (I).

In 1000 ml. of water was dissolved 130.5 g. of ammonium tungstate $(5(NH_4)_2O \cdot 12WO_3 \cdot 5H_2O)$.

In the ammonium tungstate solution was dissolved 4.6 g. of phosphoric acid, purity 85% (II).

As the carrier component was used 180 g. of silica sol containing 20% (by weight) $SiO_2$ (III).

(I) and (III) were mixed followed by mixing with (II). The resulting mixture was heated under good stirring to dryness. The dried mass, after being pulverized, was calcined at 200° C. for 2 hours and then at 400° C. for 2 hours, followed by addition of water. The hydrated mass was kneaded, dried at 130° C. for 16 hours and then pulverized. The pulverized mass was calcined at 650° C. for 4 hours.

Example 10

A catalyst with the empirical formula $$Mn_{10}W_2B_{0.5}O_{26.8}(SiO_2)_{30}$$

was prepared in accordance with the procedures described in Example 9 except that boric acid was used in place of the phosphoric acid.

Example 11

A catalyst with the empirical formula $$Mn_{10}W_{25}S_{1.0}O_{98}(SiO_2)_{30}$$

was prepared in accordance with the procedures described in Example 9 except that sulfuric acid was used in place of the phosphoric acid.

Example 12

A catalyst with the empirical formula $$Mn_{10}W_{25}Se_{0.5}O_{95.5}(SiO_2)_{30}$$

was prepared in accordance with the procedures described in Example 9 except that selenium dioxide was used in place of the phosphoric acid.

Examples 13 and 14

A catalyst with the empirical formula $$Mn_{10}W_3Te_3O_{35}(SiO_2)_{30}$$

(Example 13) and one with the empirical formula $$Mn_{10}W_{25}Te_{12}O_{119}(SiO_2)_{30}$$

(Example 14) were prepared respectively in accordance with the procedures described in Example 9 except that telluric acid was used in place of the phosphoric acid.

Example 15

A catalyst with the empirical formula $$Co_{10}W_{25}O_{85}(SiO_2)_{30}$$

was prepared in accordance with the procedures described in Example 7 except that cobalt nitrate was used in place of the manganese nitrate.

Example 16

A catalyst with the empirical formula $$Co_{10}W_{25}P_{1.5}O_{88.8}(SiO_2)_{30}$$

was prepared in accordance with the procedures described in Example 9 except that cobalt nitrate was used in place of the manganese nitrate.

Example 17

A catalyst with the empirical formula $$Ni_{10}W_2Te_{10}O_{36}(SiO_2)_{30}$$

was prepared in accordance with the procedures described in Example 9 except that nickel nitrate was used in place of the manganese nitrate and telluric acid as the tellurium component.

Example 18

A catalyst with the empirical formula $$Cd_{10}W_{25}Se_1O_{86}(SiO_2)_{30}$$

was prepared in accordance with the procedures described in Example 9 except that cadmium nitrate was used in place of the manganese nitrate and selenium dioxide as the selenium component.

Example 19

A catalyst with the empirical formula $$Pb_{10}W_{10}O_{50}(SiO_2)_{30}$$

was prepared in accordance with the procedures described in Example 7 except that lead nitrate was used in place of the manganese nitrate.

Conditions under which final calcination of these catalysts was conducted are shown in the table.

Methods and Results of the Tests

A U-shaped steel tube 16 mm. in inner diameter was filled with 30 ml. of the catalyst formed into cylinders 2 mm. in diameter and 2 mm. in height. The tube was heated in a niter bath, consisting of an equiweight mixture of sodium nitrite and potassium nitrate. Through the reactor was passed a gas of the composition given below at the rate given below.

$O_2$ (supplied in the form of air)/isobutylene=3.5 (molar ratio)
$NH_3$/isobutylene=1.3 (molar ratio)
$H_2O$/isobutylene=4.0 (molar ratio)
Hourly charge=15 liters (NTP)

Temperature of the niter bath was successively changed and reaction was carried out at each temperature for several hours. Reaction gas was isolated and analyzed by gas chromatography.

Optimum temperature at which conversion from isobutylene to methacrylonitrile was maximum as well as conversion and selectivity at that temperature were determined for each catalyst.

Results of the tests are shown in the table.

The total conversion of isobutylene, selectivity of methacrylonitrile and conversion of isobutylene to methacrylonitrile as referred to herein are defined as follows:

Total conversion of isobutylene $$= \frac{\text{Carbon weight of isobutylene reacted}}{\text{Carbon weight of isobutylene supplied}} \times 100\%$$

Selectivity of methacrylonitrile $$= \frac{\text{Carbon weight of methacrylonitrile formed}}{\text{Carbon weight of isobutylene reacted}} \times 100\%$$

Conversion of isobutylene to methacrylonitrile $$= \frac{\text{Carbon weight of methacrylonitrile formed}}{\text{Carbon weight of isobutylene supplied}} \times 100\%$$

and a molar ratio of ammonia:isobutylene of 0.7:1–3:1, with a catalyst consisting of an intimate blend of
(i) an oxide consisting of oxygen and an element (A) selected from the group consisting of iron, manganese, cobalt, nickel, cadmium and lead and
(ii) an oxide of tungsten
in which the atomic ratio of tungsten to (A) is in the range of about 1:10 to 90:10.

4. A process as in claim 3 wherein the catalyst additionally contains a promoter component consisting of an oxide consisting of oxygen and an element (B) selected from the group consisting of phosphorus, boron, sulfur, selenium and tellurium, and the atomic ratio of (B) to (A) is up to about 15:10.

5. A process as in claim 1 wherein the catalyst is cal-

TABLE

| Example | Composition of the catalyst (atomic ratio) | | | | Conditions for final calcination of the catalyst | | Optimum reaction temperature (°C.) | Percent | | |
|---|---|---|---|---|---|---|---|---|---|---|
| | Component A | W | Promoter | Si | Temperature (°C.) | Time (hrs.) | | Total conversion | Conversion to methacrylonitrile | Selectivity to methacrylonitrile |
| 1 | Fe 10 | 2 | -- | 30 | 900 | 2 | 420 | 82 | 43 | 52 |
| 2 | Fe 10 | 2 | P 0.5 | 30 | 900 | 2 | 435 | 90 | 59 | 66 |
| 3 | Fe 10 | 2 | B 1.0 | 30 | 900 | 2 | 435 | 91 | 59 | 65 |
| 4 | Fe 10 | 2 | Se 0.5 | 30 | 850 | 5 | 430 | 93 | 62 | 67 |
| 5 | Fe 10 | 2 | Te 2.0 | 30 | 850 | 5 | 430 | 93 | 65 | 70 |
| 6 | Fe 10 | 25 | Te 4.0 | 30 | 700 | 5 | 430 | 92 | 63 | 68 |
| 7 | Mn 10 | 2 | -- | 30 | 650 | 4 | 420 | 80 | 36 | 45 |
| 8 | Mn 10 | 25 | -- | 30 | 650 | 4 | 420 | 81 | 34 | 42 |
| 9 | Mn 10 | 25 | P 2.0 | 30 | 650 | 4 | 430 | 83 | 43 | 52 |
| 10 | Mn 10 | 2 | B 0.5 | 30 | 600 | 4 | 420 | 82 | 41 | 50 |
| 11 | Mn 10 | 25 | S 1.0 | 30 | 600 | 4 | 410 | 80 | 40 | 50 |
| 12 | Mn 10 | 25 | Se 0.5 | 30 | 650 | 4 | 420 | 82 | 43 | 53 |
| 13 | Mn 10 | 3 | Te 3 | 30 | 700 | 4 | 430 | 83 | 45 | 54 |
| 14 | Mn 10 | 25 | Te 12 | 30 | 650 | 4 | 420 | 82 | 42 | 51 |
| 15 | Co 10 | 25 | -- | 30 | 650 | 4 | 410 | 80 | 35 | 44 |
| 16 | Co 10 | 25 | P 1.5 | 30 | 650 | 4 | 420 | 83 | 44 | 53 |
| 17 | Ni 10 | 2 | Te 10 | 30 | 600 | 4 | 410 | 82 | 49 | 60 |
| 18 | Cd 10 | 25 | Se 1.0 | 30 | 650 | 4 | 420 | 83 | 43 | 52 |
| 19 | Pb 10 | 10 | -- | 30 | 600 | 4 | 410 | 82 | 32 | 39 |

We claim:

1. A process for the production of methacrylonitrile from isobutylene which comprises contacting a mixture of isobutylene, ammonia and oxygen in the vapor phase at a temperature of from about 370° to about 550° C. with a catalyst consisting of an intimate blend of
   (i) an oxide consisting of oxygen and an element (A) selected from the group consisting of iron, manganese, cobalt, nickel, cadmium and lead and
   (ii) an oxide of tungsten
in which the atomic ratio of tungsten to (A) is in the range of about 1:10 to 90:10.

2. A process as in claim 1 wherein the catalyst additionally contains a promoter component consisting of an oxide consisting of oxygen and an element (B) selected from the group consisting of phosphorous, boron, sulfur, selenium and tellurium, and the atomic ratio of (B) to (A) is up to about 15:10.

3. A process for the production of methacrylonitrile from isobutylene which comprises contacting a mixture of isobutylene, ammonia and oxygen in the vapor phase at a having a molar ratio of oxygen:isobutylene of 0.5:1–6:1 temperature in the range of 370° C.–550° C., said mixture cined at a temperature of 500° C.–1000° C. for from about 1 to about 48 hours.

6. A process as in claim 1 wherein the space velocity of the mixture is from 2000–100 hr.$^{-1}$.

7. A process as in claim 1 wherein the catalyst is combined with from 10–90% by weight of an inert silica carrier.

8. A process as in claim 1 wherein the catalyst is subjected to heat treatment at a temperature of 200° C.–600° C. for 2–24 hours and then calcined at a temperature in the range of 500° C.–1000° C. for 1–48 hours.

References Cited

UNITED STATES PATENTS

| | | | |
|---|---|---|---|
| 3,161,671 | 12/1964 | Minekawa et al. | 260—465.3 |
| 3,226,421 | 12/1965 | Giordano et al. | 260—465.3 |
| 3,280,167 | 10/1966 | Schwarzer et al. | 260—465.3 |
| 3,471,545 | 10/1969 | Giordano et al. | 260—465.3 |
| 3,392,189 | 7/1968 | Eden | 260—465.3 |
| 3,542,843 | 11/1970 | Yoshino et al. | 260—465.3 |

JOSEPH PAUL BRUST, Primary Examiner

UNITED STATES PATENT OFFICE
CERTIFICATE OF CORRECTION

Patent No. 3,784,560                Dated  January 8, 1974

Inventor(s)   Takachika Yoshino et al.

It is certified that error appears in the above-identified patent and that said Letters Patent are hereby corrected as shown below:

Column 7, lines 59 and 60, should appear as shown below:

-- temperature in the range of 370° C.-550° C., said mixture having a molar ratio of oxygen:isobutylene of 0.5:1-6:1 --.

Signed and sealed this 15th day of October 1974.

(SEAL)
Attest:

McCOY M. GIBSON JR.
Attesting Officer

C. MARSHALL DANN
Commissioner of Patents